March 26, 1940. C. D. WILLSON 2,194,964
SPRING SUSPENSION FOR VEHICLES
Filed July 8, 1937 2 Sheets-Sheet 2
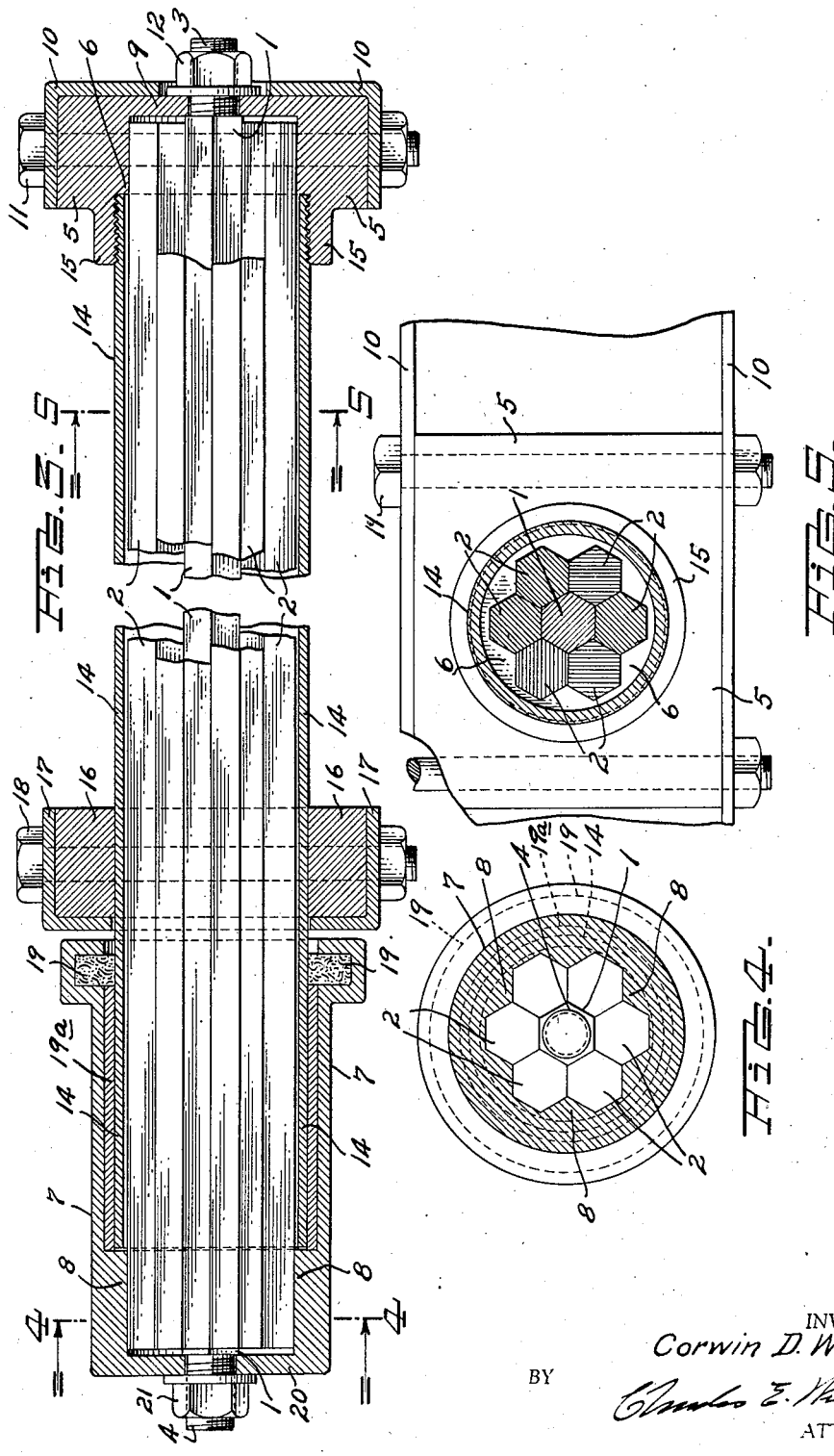
INVENTOR.
Corwin D. Willson
BY
ATTORNEY.

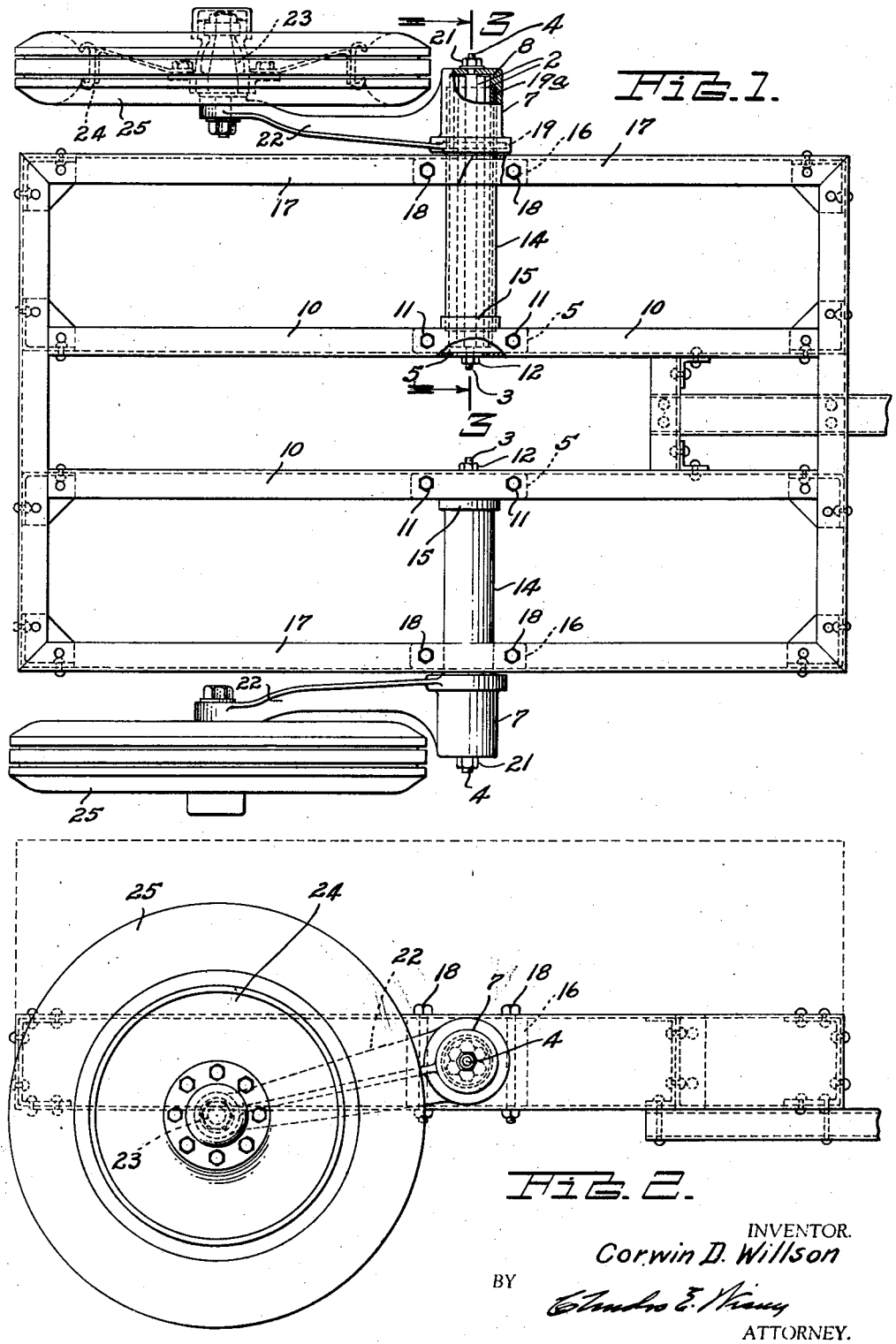

Patented Mar. 26, 1940

2,194,964

UNITED STATES PATENT OFFICE 2,194,964

SPRING SUSPENSION FOR VEHICLES

Corwin D. Willson, Flint, Mich.

Application July 8, 1937, Serial No. 152,596

12 Claims. (Cl. 267—57)

This invention relates to spring construction, the object being to provide a torsionally resilient spring comprising a series of nested rod like elements held at one end from rotation on their axis or about a common axis and a torque arm secured to the opposite ends turnable upon the common axis of the group of rods to thereby submit the individual rods to twisting and bending stresses.

It is further an object and feature of the invention to provide a spring suspension for vehicles wherein the vehicle wheels are rotatably supported on spindles attached to the free end of the torque arm and the rod like elements extending normally in parallel relation transversely of the vehicle body and providing a construction wherein the vehicle body is so supported as to enable the bottom of the body to be positioned below the plane now possible in present day vehicle spring structures and secure a vehicle construction in which the center of gravity is low.

More specifically, the invention consists of a torsional spring element comprising a series of rods arranged in parallel relation about a common center, the said rods at one end being held from axial movement and from rotative movement about the common center, and a torque arm in one end of which the opposite ends of the rods are received, the torque arm being turnable upon the common axis of the rods whereby the turning force applied to the free end of the torque arm in either a clockwise or anti-clockwise direction tends to twist the rods upon their axes and to submit the rods to bending stresses thereby causing the same to assume a spiral form.

It is further an object and feature of the invention to provide a spring construction comprising a series of nested torsionally resilient segments and a casing enclosing and supporting the same and providing a container for lubricant whereby friction between the segments is reduced to a minimum and the spring structure maintained free of dust and dirt.

A further principal feature and object of the invention is to provide a spring suspension for wheeled vehicles which includes a torsionally resilient spring element positioned with its axis extending transversely of the vehicle, a torque arm connected with the torsional element at a right angle to the axis thereof and a road wheel carried by the torque arm.

A further feature and object of the invention is to provide a spring suspension for wheeled vehicles wherein a torque arm is connected at one end with nested torsional segments extending transversely of the body, the torque arm being adapted to be coupled with the torsional segments at different angles to the horizontal to adjust the same to the weight of the vehicle or to adjust the height at which the bottom of the vehicle is supported relative to the ground and by the provision of the series of torsional segments the breaking of one does not destroy the spring action of the remainder and providing a spring suspension for the wheel of a vehicle acting independently from that of similar other wheels.

These objects and the several novel features of the invention are hereinafter more fully described and claimed, and the preferred form of construction of a spring construction embodying invention is shown in the accompanying drawings in which—

Fig. 1 is a plan view of a vehicle frame or chassis equipped with my improved spring suspension.

Fig. 2 is a side elevation of the device shown in Fig. 1.

Fig. 3 is an enlarged longitudinal section through one of the springs taken on line 3—3 of Fig. 1.

Fig. 4 is a section taken on line 4—4 of Fig. 3.

Fig. 5 is a section taken on line 5—5 of Fig. 3.

The spring structure, as hereinafter described, is of a form which includes what I have termed "nested torsional segments", or a segmented spring structure and is usable for various purposes, one of which is herein described as a spring suspension for wheeled vehicles wherein a torque arm carries the wheel on a spindle at its free end and the torsional segments extend transversely of the vehicle body with the torque arm in trailing relation, the construction permitting the body to be lowered in position in comparison with present types of vehicle spring suspension to provide road clearance and secure a low center of gravity. The vehicle is herein shown as a trailer for an automotive or other type of vehicle.

In present day construction, the axle extends transversely of the body and springs are carried by the axle which support the body thereabove and such structures, when loaded, have a high center of gravity and tend to upset the trailer in rounding sharp curves at the usual rate of speeds now possible with automotive vehicles. Such condition is avoided by my new spring suspension.

The device consists primarily of a series of rods which may be of any particular cross sectional form. In Figs. 3, 4 and 5, I have illustrated the rods as hexagonal in form in cross section due to the fact that this form provides a compact nesting arrangement, though round rods, bars or tubes would also operate effectively. The rods ar grouped to provide a central rod 1 shown in Fig. 5 with a series of six rods 2 grouped about the central rod. A greater or smaller number of rods may be used with equal facility. These rods are all of the same length except the central rod 1 which is provided with extending ends 3 and 4 which are round and are threaded as shown to act as a tie rod to tie the parts together. At one end, an anchor bracket member or spline block 5 is provided shaped to fit about the several rods by means of the portions 6 and a bracket member 7 is provided at the opposite ends of the rods and has a central portion 8 also shaped to fit about the several rods as shown in Fig. 4. The portion 8 extends closely about three sides of each of the outer rods 2 to hold them firmly in the relation shown in Figs. 4 and 5 and the portion 6 of the member 5 at the opposite end is made in the same manner to hold the rods together. The rods 2 are slightly less in length than the distance between the brackets 5 and 7 in which they slide. The bracket member 5 is provided with an end wall 9 extending across the ends of the rods as shown in Fig. 3 and with an aperture through which the threaded end 3 of the central rod extends. The bracket member 5 may be secured in the vehicle frame member 10 as shown in Figs. 1 and 3 by means of bolts 11.

The frame member 10 is also provided with an aperture through which the nut 12 on the end 3 of the rod 1 extends as shown in the center of Fig. 1. By means of the bolts 11, the block 5 is rigidly secured in position in the vehicle frame.

A tubular casing 14 is positioned about the several rods as shown in Figs. 1, 3 and 5 and extends into the flange 15 of the block 5 at one end. This tubular casing 14 also extends through a support block 16 mounted in the frame member 17 by means of the bolts 18 and the end bracket member 7 is shaped to receive the end of the tubular casing 14 as shown in Fig. 3. This end bracket member 7 is also provided with a packing 19 to prevent leakage of lubricant longitudinally of the casing 14 and also has a bushing 19a to provide a proper bearing. The member 7 is provided with an end wall 20 as shown in Fig. 3 and the threaded end 4 of the central rod 1 extends through this end wall and is provided with a nut 21 so that by tightening the nuts 12 and 21 the parts are all held together. The end bracket member 7 is provided with an integral extending arm 22 shown in Figs. 1 and 2 and at the end the arm 22 is provided with a spindle 23 on which the wheel 24 having a tire 25 is rotatably mounted. By this arrangement, the end bracket member 7 and arm 22 may turn on the axis of the central rod 1 which acts as the axis from which the wheels are sprung.

Due to the fact that the ends of the rods are held in fixed position in the frame by means of the portion 6 of the bracket member 5, the turning movement of the member 7 and arm 22 is applied to the rods by means of the portion 8 of the member 7 which fits the rods closely as shown in Fig. 4. Thus, as the integral arm 22 and member 7 is turned, it twists the rods as a group and as the rods are held in the bracket 5 the tendency of the rods to resist turning provides the spring action. In this connection, it will be noted that there are two spring actions, one is a torque action on the individual rods produced by the twisting action of the individual rods on their individual axes and the other is a bending action produced in twisting the several rods spirally about a common axis while restrained within the limits of the tubular housing or casing 14. It is also to be noted that this spring acts in both a clockwise and a counter-clockwise direction as will be understood from Fig. 2 in which it will be seen that a clockwise movement of the arm 22 about the axis of the rod 1 is resisted by the torque and bending action of the several rods and a counter-clockwise movement of the arm 22 is resisted in the same manner. It is also to be noted that as the arm 22 clears the frame of the vehicle, this action may be of considerable extent without any contact with the vehicle whatever.

With the parts arranged as shown in Fig. 3, the tubular casing 14 may be filled with lubricant to encase the several rods in the lubricant between the several rods so that friction between the rods is reduced to a minimum to allow free spring action of the rods and lubricates the hub bushing 19a. As the end member 7 turns on the tubular casing 14 to a slight extent, the packing 19 will prevent leakage of the lubricant along the exterior of the tubular casing 14. By removing the nut 21 the end bracket member 7 may be withdrawn from the ends of the rods sufficiently to disengage the portions 8 from the rod ends, at which time the member 7 may be turned so that the portions 8 engage between different pairs of rods. This adjustment will allow the vehicle frame to be raised or lowered in relation to the ground to give greater or less road clearance as desired.

While I have described one application of my improved spring to provide a wheel suspension for a vehicle, the spring may be used for a great number of other purposes as long as one end of the rods are fixed or held while the other ends of the rods are secured in a member which may be turned to twist the rods on their own axes and about a common axis to yieldably resist such turning movement.

From the foregoing description, it will be observed that the central rod is shouldered at each end and engages the bottom of the respective brackets or spline blocks 5 and 7 and that the rods themselves are of a length slightly less than the distance between the walls of the blocks or brackets so that they are free to slide in the respective blocks as the rods are turned spirally about the center axis and as this angle of spiral is increased or diminished, the rods will slide in one direction or the other in the blocks.

In the structure shown, the weight of the vehicle body is transferred to the spline block 7 through the tubular casing 14 and with the wheel being on the ground this tends to turn the torque arm 22 thereby transferring the strain to the torsion members. The tubular casing housing the torsional elements is rigidly attached to the vehicle frame and serves as the axis of the torque arm.

It is also to be noted that it is preferable to have the ends of the rods 2 other than round in cross section. Although the round rods or round ended rods will act through bending stress to spring support the vehicle, it is nevertheless desirable to have the ends of the arms at least of such form and received in corresponding recesses in the spline block that rotation of the torque arm on the axis of the housing tends to turn the rods on their axes whereby the rods are subjected to both torsional and bending stresses. It is believed further evident that the device is simple in construction and efficient in operation and that by the length and diameter of the torsion rods, variation in flexibility is provided for and enables the structure to be designed for any particular weight to be sustained thereby, and it will be further observed that the objects and features of the invention are attained by the structure described.

Having thus fully described my invention, its utility and mode of operation, what I claim and desire to secure by Letters Patent of the United States is:

1. A spring suspension for vehicles comprising a series of hexagonal rods grouped together about a central hexagonal rod, a bracket member at each end of the grouped rods fitting over and firmly engaging the ends of the grouped rods to hold them in assembled relation, the central rod extending through both end bracket members, a tubular casing extending between the end bracket members and supported thereby, a nut on each end of the central rod securing the bracket members and casing together and retaining the rods in engagement in the end bracket members, one end bracket member being attached to the vehicle frame, an arm extending from the other end bracket member transversely to the axes of the rods, a wheel rotatably supported by the end of said arm, and a support block supported in the vehicle frame between the end bracket members and the tubular casing extending through said support block.

2. A spring suspension for vehicles comprising a central hexagonal rod, a series of hexagonal rods grouped together about said central hexagonal rod, a bracket member at each end of the grouped rods splined to receive the ends of the grouped rods to hold them in assembled relation, the central rod extending through both end bracket members, a tubular casing extending between the splined bracket members, means on the central rod securing the bracket members and casing together and retaining the rods in engagement in the end bracket members, one end bracket member being attached to the vehicle frame and the other bracket member being rotatable on the casing, an arm extending from the rotatable bracket member transversely of the axes of the rods, and a wheel rotatably supported by the end of said arm.

3. A spring suspension for vehicles having a frame comprising a bracket member attached to the frame, a series of rods held in said bracket member, the rods extending from the bracket in longitudinal contact, a bracket member for the free ends of the rods and arranged to hold the free ends of the rods together, one rod of the group of rods extending through both bracket members and securing the bracket member and rods together, an arm on the bracket member on the free ends of the rods, and a wheel rotatably supported by the end of said arm, the arrangement being such that movement of the wheel and arm is resisted in either direction by the twisting action of the rods produced by such wheel movement.

4. A spring suspension for vehicles comprising a series of rods grouped about a central rod, a fixed bracket member secured to the vehicle, the rods being secured at one end to the bracket member, a rotatable bracket member receiving the other ends of the rods and having an integral arm, the central rod extending through both bracket members and securing the same together, a tubular casing fitting about the rods and mounted in the two bracket members, and a wheel rotatably mounted on the arm at a distance from its axis of rotation.

5. A spring construction for vehicles having a frame comprising a series of rods grouped together, a splined bracket member holding the rods from rotation at one end, means for securing the bracket to the vehicle frame, a rotatable bracket member receiving the opposite ends of the rods a central rod of the series being supported in the brackets and securing the same together, an arm extending from said rotatable bracket member, a wheel rotatably supported by said arm, the arrangement being such that relative movement of the wheel and frame is resisted by the torsional and bending stresses to which the rods are subjected.

6. A spring comprising a series of flexible and resilient rods arranged in a group about a rod providing a common center and with their longitudinal axes in parallel relation, a splined member at each end of the rods in which the rod ends except the ends of the central rod are slidably supported, means for securing the said members in a fixed spaced relation, one of the said end members being fixed and the other of the said end members being rotatable about the common axis of the rods, the turning of the said rotatable member tending to twist the rods spirally in respect to the common axis whereby the turning movement is resisted.

7. A spring comprising a series of flexible and resilient hexagonal rods grouped together in parallel relation about a central hexagonal rod, a member at each end of the grouped rods splined to receive the ends of the grouped rods to hold the same in assembled relation, the central rod being secured to the end members and holding the rods and end members together in assembled relation with corresponding flat faces in contact, the arrangement being such that as one end member is turned relative to the other the assembled rods are subjected to torsional and bending stresses.

8. A spring comprising a series of flexible and resilient rods grouped together about a central rod, a member at each end of the group engaging the respective ends of the rods, the central rod extending through both members, means on the central rod holding the end members in fixed spaced relation, the arrangement being such that turning of one end member in relation to the other twists the group of rods about a common center.

9. A spring comprising a series of flexible and resilient rods grouped together, a casing enclosing and maintaining the rods in the grouped relation, the rods being greater in length than the casing, an end member for each end of the grouped rods in which the extending ends thereof are received and held from relative displacement, one of the said end members being fixed and the other relatively rotatable to thereby submit the rods to torsional and bending stresses, the casing and rod receiving ends of the said end members being filled with lubricant, and packing means associated with the rotatable member to prevent leakage of lubricant from the casing.

10. A spring comprising a series of flexible and resilient rods grouped together about a central rod, the several rods having their longitudinal axes in parallel relation, a tube enclosing the rods, a member secured to one end of the tube and receiving an end of each of the rods, the rod ends and the receiving end of the said member being so formed as to prevent the rods from turning axially and rotatably as a group, and an end member for receiving the opposite ends and rotatably mounted upon the tube, rotation of the said rotatable member tending to turn the rods upon their axes and to twist the same spirally.

11. A spring comprising a series of flexible and resilient rods arranged in a group with their axes in parallel relation, a casing enclosing said group of rods, a member secured to one end of the casing and arranged to receive the ends of the rods, a member rotatably mounted upon the casing at the opposite end and arranged to receive the other ends of the rods, the casing enclosing the group of rods being filled with a lubricant, and a packing means between the rotatable element and the casing to prevent leakage of lubricant therefrom.

12. A spring suspension for wheeled vehicles having a frame comprising a transverse tubular housing rigidly secured to the vehicle frame, a series of nested torsional elements in the housing and anchored at one end, said housing holding the nested torsional elements between their ends from material displacement in planes at a right angle to their axes, a torque arm secured to the opposite end thereof to turn about the axis of the housing at substantially a right angle thereto, a wheel spindle secured to the torque arm, and a vehicle wheel on the spindle and functioning under relative displacement of the wheel and frame to turn the torque arm and apply leverage to twist and bend the torsional segments within the housing.

CORWIN D. WILLSON.